United States Patent [19]
Savy et al.

[11] Patent Number: 5,986,371
[45] Date of Patent: Nov. 16, 1999

[54] MOTOR UNIT FOR A MOTOR VEHICLE WIPER AND INCLUDING A DUCT FOR WASHING LIQUID

[75] Inventors: Xavier Savy; Joël Princet, both of Chatellerault, France

[73] Assignee: Valeo Systemes D'Essuyage, La Verriere, France

[21] Appl. No.: 09/064,646

[22] Filed: Apr. 22, 1998

[30] Foreign Application Priority Data

Apr. 22, 1997 [FR] France .................................. 97 04951

[51] Int. Cl.⁶ .............................. B60S 1/56; H02K 5/00; H02K 5/04
[52] U.S. Cl. .......................................... 310/89; 15/250.01
[58] Field of Search ......................... 310/89; 15/250.001, 15/250.01, 250.02, 250.03, 250.04

[56] References Cited

U.S. PATENT DOCUMENTS

| | | | |
|---|---|---|---|
| 3,815,168 | 6/1974 | Hussey | 15/250.12 |
| 4,428,533 | 1/1984 | Pietryk et al. | 239/284 |
| 5,195,206 | 3/1993 | Bauer et al. | 15/230.01 |
| 5,203,049 | 4/1993 | Nogawa | 15/250.02 |
| 5,454,134 | 10/1995 | Edele et al. | 15/250.04 |
| 5,711,487 | 1/1998 | Hommelet | 239/284.1 |

FOREIGN PATENT DOCUMENTS

| | | |
|---|---|---|
| 2639593 | 6/1990 | France . |
| 2722463 | 1/1996 | France . |
| 35 11 811 | 10/1986 | Germany . |
| 35 11 812 | 10/1986 | Germany . |
| 36 32 734 | 3/1988 | Germany . |
| 195 48 820 | 1/1997 | Germany . |

OTHER PUBLICATIONS

French Search Report dated Jan. 26, 1998.

*Primary Examiner*—Nestor Ramirez
*Assistant Examiner*—Burt Mullins
*Attorney, Agent, or Firm*—Morgan & Finnegan LLP

[57] ABSTRACT

The wiper motor unit for a motor vehicle includes a case comprising a base and a cover adapted to close the base and define an inside enclosure of the case, the motor unit having a duct adapted to convey a liquid, isolated from the inside enclosure, and defined by one element of the base and the cover, the motor unit further including an outlet shaft. The duct extends outside the shaft.

23 Claims, 2 Drawing Sheets

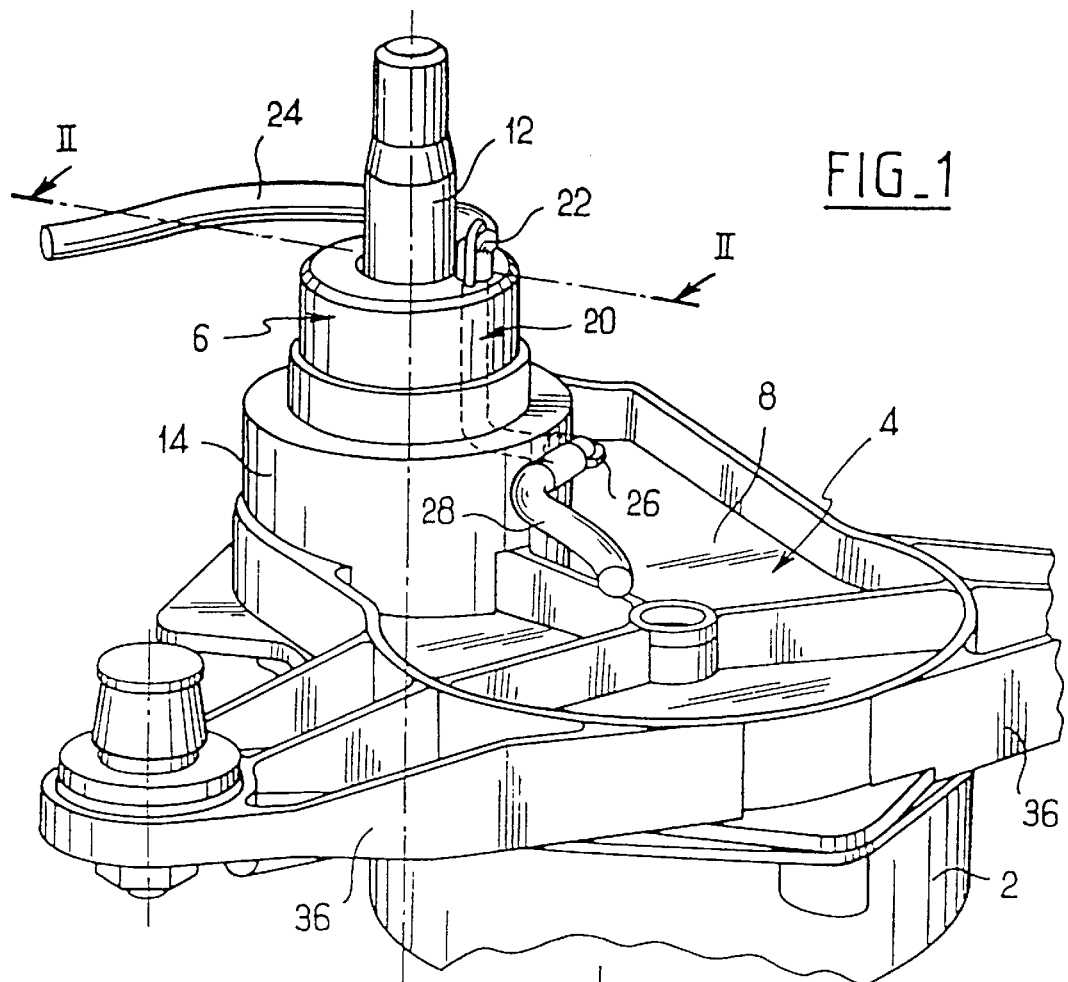
FIG_1
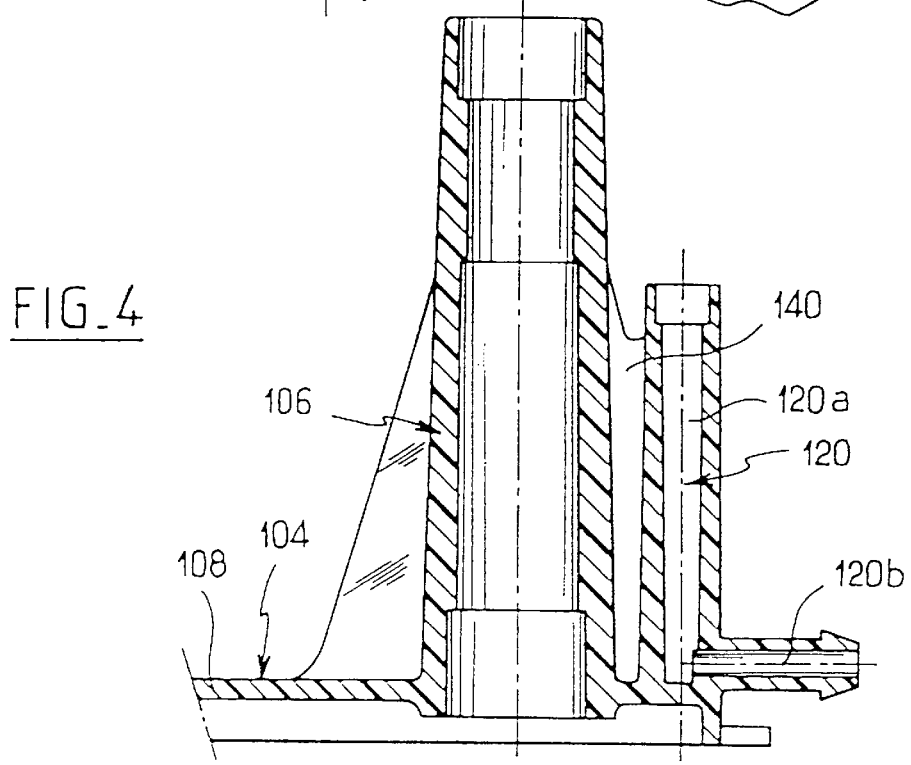
FIG_4

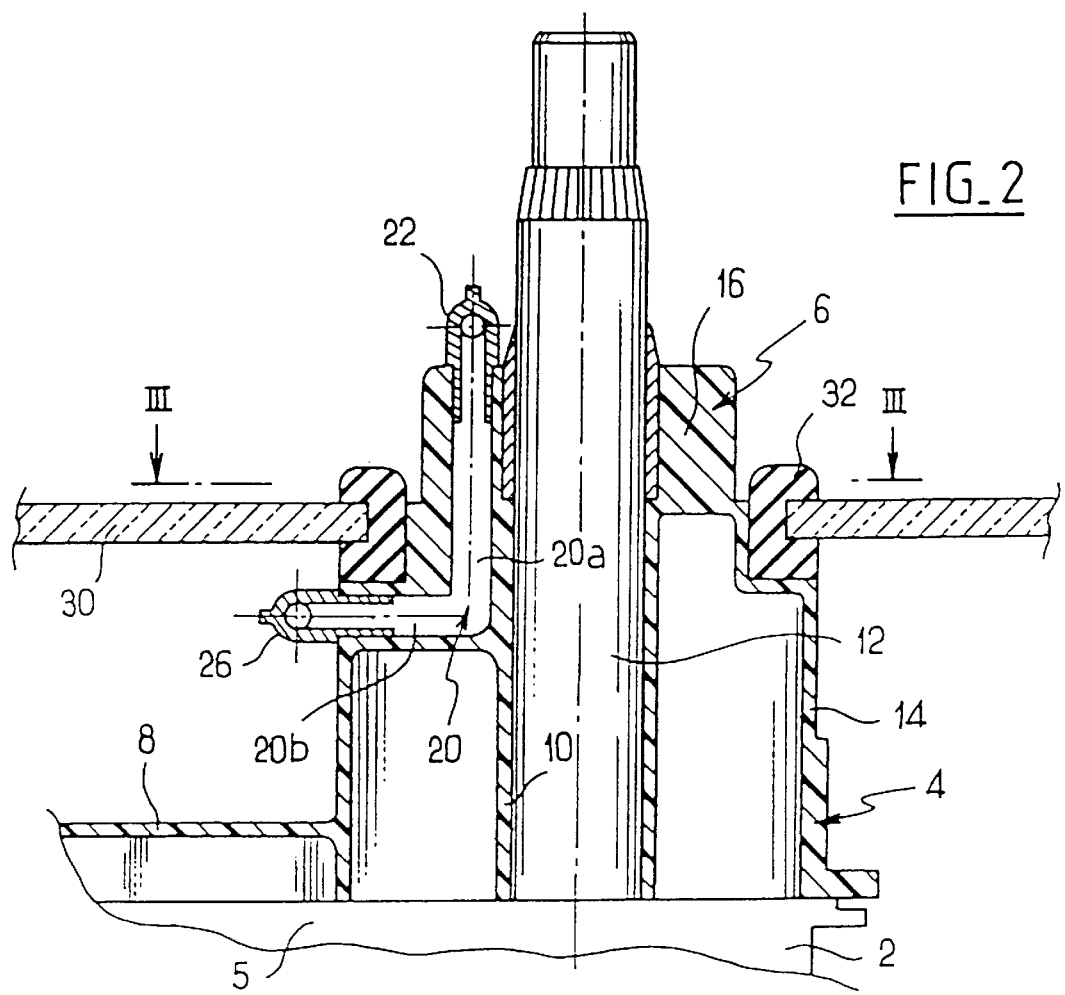
FIG_2
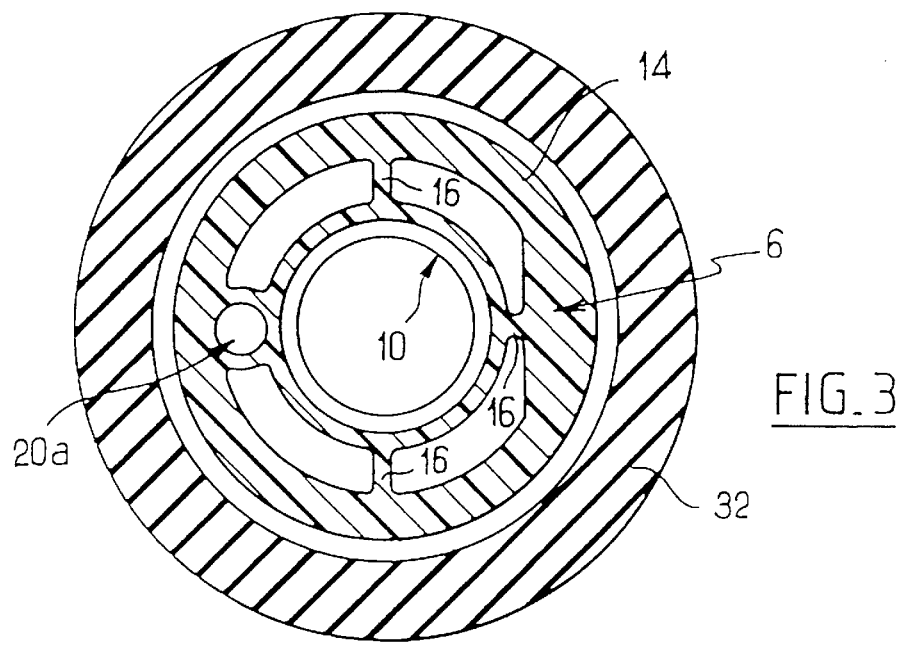
FIG_3

MOTOR UNIT FOR A MOTOR VEHICLE WIPER AND INCLUDING A DUCT FOR WASHING LIQUID

BACKGROUND OF THE INVENTION

The invention relates to motor units for motor vehicle wipers.

FIG. 12 of EP 0 414 873 discloses a motor vehicle wiper motor unit in which the wiper blade is mounted on one end of an outlet shaft of the motor unit. The motor unit is adapted to impart alternating rotary motion to the shaft relative to the housing of the unit. A washing liquid feed duct is provided, said duct extending coaxially along the outlet shaft of the motor unit from one of its axial ends to the other. In order to provide good sealing between its outlet shaft and its stationary portions, that motor unit suffers from the drawback of it being necessary to manufacture and assemble together a relatively large number of parts.

Document DE 36 32734 discloses a wiper motor unit in which the cover of the case includes a rod that is integral therewith and that extends outside the case. A hollow shaft is engaged on the rod. It serves as a support for the wiper blade and it is rotated by the motor unit. A washing liquid feed duct runs along the axis of the fixed rod. In order to provide good sealing between the stationary portions and the moving portions, in this case at the wiper blade end, it is necessary to provide a large number of parts and for them to be assembled with great precision.

BRIEF SUMMARY OF THE INVENTION

The preferred embodiments mitigate that drawback by providing a different motor unit comprising a small number of parts and not requiring precision assembly.

The preferred embodiments provide a wiper motor unit for a motor vehicle, including a case comprising a base and a cover adapted to close the base and define an inside enclosure of the case, the motor unit having a duct suitable for conveying a liquid, which duct is isolated from the inside enclosure and is defined by one element among the base and the cover, the motor unit including an outlet shaft, and wherein the duct extends outside the shaft.

In this way, the duct may be connected to other stationary portions of the motor unit to provide good sealing without requiring a large number of parts and without requiring high precision assembly.

The duct may extend at a distance from the shaft.

The duct may extend only on one side.

The element defining the duct may be made of plastics material.

The duct may thus be manufactured by low cost molding.

The elements defining the duct comprises a shank adapted to receive the outlet shaft of the unit, the duct extending in a general direction that is parallel to the shank.

The duct may extend in the wall of the shank. The duct may extend at a distance from the wall of the shank.

The element defining the duct may also includes members for fixing the motor unit to the vehicle.

The motor unit may be used for a back window wiper.

A preferred embodiment also provides a case for a wiper motor unit for a motor vehicle, the case comprising a base and a cover adapted to close the base and to define an inside enclosure of the case, one element among the base and the cover defining a duct that is adapted to convey a liquid and that is isolated from the inside enclosure, wherein the element defining the duct has a housing adapted to receive an outlet shaft of the motor unit, with the duct being outside the housing.

BRIEF DESCRIPTION OF THE DRAWINGS

Other characteristics and advantages of the invention appear further from the following description of two preferred embodiments given as non-limiting examples. In the accompanying drawings, FIG. 1 is a fragmentary perspective view of a motor unit constituting a first embodiment of the invention;

FIG. 2 is an axial section view on plane II—II through the motor unit of FIG. 1, shown mounted on a vehicle window;

FIG. 3 is a cross-section view on the plane III—III through the motor unit of FIG. 2; and FIG. 4 is a fragmentary axial section view of a motor unit cover constituting a second embodiment of the invention.

DETAILED DESCRIPTION OF THE INVENTION

With reference to FIGS. 1 to 3, in a first embodiment, the motor unit comprises a base 2 having an end wall and side walls, and a closure plate or cover 4 adapted to close the base 2 at the end of its side wall remote from its end wall. The base 2 and the cover 4 together constitute a case for the motor unit, and by this disposition they define a closed internal enclosure 5 of the case.

The cover 4 includes a cylindrical shank 6 integrally formed therewith, projecting outwards from a substantially plane wall 8 of the cover.

The shank 6 comprises a wall having a cylindrical inner skirt 10 extending from one of the axial ends of the shank to the other. The motor unit has an outlet shaft 12 received coaxially in the housing thus defined by the skirt 10 with an axial end that emerges from a free end of the shank to enable a wiper blade to be mounted on the shaft. The inner skirt 10 guides the outlet shaft 12 in rotation relative to the case. The shaft is free to pivot about its own axis and it is driven with alternating motion by a conventional motion-transforming mechanism housed inside the enclosure 5 and driven by the motor of the unit which is against the case of the unit.

The shank 6 has an outer skirt 14 extending coaxially about the inner skirt 10 and at a distance therefrom. The outer skirt 14 has three successive longitudinal segments all of which are cylindrical in shape, having respective diameters that become smaller going away from the plate 8 to the free end of the shank. Reinforcing ribs 16 disposed radially relative to the axis of the shank connect the inner skirt 10 to the narrowest segment of the outer skirt 14.

The shank 6 defines a duct 20 that exists entirely within the wall of the shank. The duct 20 has a first rectilinear elongate segment 20a parallel to the axis of the shank with one end that opens out in the vicinity of the free end of the shank, and it runs along the two narrower segments of the outer skirt 14. The first segment 20a is outside the skirt 10 and the shaft 12, and at a distance therefrom. In addition, this segment has a cross-section relative to its longitudinal axis which is located entirely on a single side of the skirt and the shaft. The duct 20 has a second rectilinear elongate segment 20b that is perpendicular to the first and radial to the axis of the shank, having an end that opens to the outside of the shank 6 through the largest-diameter segment of the outer skirt 14. The two segments 20a and 20b are perpendicular to each other and in communication with each other via their other ends which meet, thereby giving the duct an L-shape.

The duct 20 is isolated from the internal enclosure 5 of the case and lies within the wall of the shank 6. The duct 20 is at a distance from the axis of the shank.

The free end of the first duct segment 20a receives either a nozzle or a coupling 22 connected to one end of a hose 24 adapted to be connected to a nozzle on the vehicle. The free end of the second duct segment 20b receives a coupling 26 connected to one end of a hose 28 adapted to be connected to a tank of window washing liquid.

This particular motor unit is designed to be mounted on a back window of a motor vehicle, with the shank 6 being inserted through a hole in the window, the middle segment of the shank being level with the edge of the hole. A sealing gasket 32 is interposed between the shank and the edge. The duct 20 enables washing liquid to be conveyed from the tank through the back window 30 to a nozzle for propelling the liquid towards the outside face of the window. The liquid is conveyed in the duct 20 while being isolated from the internal enclosure 5, and without passing through said enclosure.

The cover 4 also includes arms 36 suitable for receiving means for fixing the case to the vehicle, such as nut-and-bolt assemblies, e.g. with damper elements being interposed. The arms 36 thus serve to fix the motor unit to the inside structure of the vehicle.

In this case, the cover 4, the shank 6, and the arms 36 are constituted as a one-piece molding of plastics material.

FIG. 4 shows a second embodiment of the motor unit in which analogous elements are given the same references plus 100. This time, the outside face of the shank 106 is likewise substantially cylindrical, with the inner skirt and the outer skirt coinciding. The cover 104 defines the likewise L-shaped duct 120, but this time the duct is separate from the outside wall of the shank 106. In this case, the duct 120 is defined by two tubes defining respective segments 120a and 120b which are disposed relative to each other as in the preceding embodiment. The two tubes project from the wall 108 of the cover 104, and they are connected to the wall via their common ends which are in communication with each other. The tube parallel to the shank 106 is connected thereto by a reinforcing rib 140.

The motor unit of the invention reduces the problems of corrosion usually encountered when the washing liquid comes into contact with the motor unit (particularly when the motor unit includes elements made of magnesium). It requires only a small number of parts to be assembled together to enable the washing liquid to be conveyed in sealed manner.

The above described embodiments are illustrative of the principles of the present invention. Various modifications and changes may be devised by those skilled in the art without departing from the spirit and scope of the invention as set forth in the appended claims.

We claim:

1. A wiper motor unit comprising a base and a cover located on the base and defining an inside enclosure, a duct for conveying a liquid, wherein said duct is isolated from the inside enclosure and wherein the duct extends outside an outlet shaft isolating the liquid from the outlet shaft.

2. A motor unit according to claim 1, wherein a first segment of the duct extends parallel to the shaft.

3. A motor unit according to claim 1 wherein a second segment of the duct extends away from the shaft.

4. A motor unit according to claim 1, wherein the duct is made from one element.

5. A motor unit according to claim 4, wherein the element is made of plastic.

6. A motor unit according to claim 1, wherein the duct extends in a general direction that is substantially parallel to a shank.

7. A motor unit according to claim 6, wherein the duct extends in a wall of a shank.

8. A motor unit according to claim 1, wherein the duct extends in a wall of a shank.

9. A motor unit according to claim 1, wherein the cover includes members for fixing the motor unit to a vehicle.

10. A motor unit according to claim 1, wherein the motor unit is located on a back window wiper.

11. A case for a motor unit, the case comprising a base and a cover located on the base and defining an inside enclosure, the base and the cover defining a duct that conveys a liquid and that is isolated from the inside enclosure, wherein the cover defines a housing for receiving an outlet shaft, with the duct being outside the housing.

12. An apparatus comprising:
   a base;
   a cover located on the base;
   a duct for conveying a liquid and located in a wall of a shank,
   wherein the duct is L-shaped.

13. The apparatus of claim 12, wherein the base and the cover defines an inside enclosure, and the liquid is conveyed in the duct while being isolated from the inside enclosure.

14. An apparatus comprising:
   a base;
   a cover located on the base and defining an inside enclosure;
   a duct for conveying a liquid and located in a wall of a shank;
   wherein the duct includes a first segment and a second segment, and
   wherein the first segment is parallel to the outlet shaft and the second segment extends away from the outlet shaft.

15. An apparatus comprising:
   a base;
   a cover located on the base and defining an inside enclosure and a shank;
   a duct for conveying a liquid, said duct extends externally at a distance from a wall of the shank;
   an outlet shaft located inside the shank;
   wherein the duct includes a first segment and a second segment; and
   wherein the first segment and the second segment form an L-shape.

16. The apparatus of claim 15,
   wherein the first segment is parallel to the outlet shaft, and
   wherein the second segment is perpendicular to the outlet shaft.

17. A wiper motor unit case comprising:
   a base;
   a cover located on the base and defining an inside enclosure;
   said cover including a shank which projects outward from the cover;
   an outlet shaft for mounting a wiper blade; and
   a duct for conveying a liquid having a first segment parallel to the outlet shaft and second segment perpendicular to the outlet shaft, wherein the duct extends outside the outlet shaft isolating the liquid from the outlet shaft.

18. The wiper motor unit case of claim 17, wherein a portion of the duct is located inside the shank.

19. The wiper motor unit case of claim 17, wherein a free end of the duct is designed to be connected to a tank of window washing liquid.

20. The wiper motor unit case of claim 17, wherein the case is designed to be mounted on the back window of a motor vehicle.

21. The wiper motor unit of claim 17, wherein the liquid is conveyed in the duct while being isolated from the inside enclosure.

22. An apparatus comprising:
a base;
a cover located on the base and defining an inside enclosure; and
a means for conveying a liquid while isolating the liquid from the inside enclosure and the outlet shaft.

23. A wiper motor unit comprising:
a base;
a cover located on the base and defining an inside enclosure; and
a means for conveying a liquid while isolating the liquid from the inside enclosure and the outlet shaft.

* * * * *